United States Patent
Keohane et al.

(10) Patent No.: US 9,148,395 B2
(45) Date of Patent: Sep. 29, 2015

(54) DISPLAYING MESSAGE CONTENT DIFFERENTIAL IN POPUP WINDOW

(71) Applicant: International Business Machines Corporation, Armonk, NY (US)

(72) Inventors: Susann M. Keohane, Austin, TX (US); Shawn P. Mullen, Buda, TX (US); Jessica C. Murillo, Austin, TX (US); Gerald F. McBrearty, Austin, TX (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 13/796,207

(22) Filed: Mar. 12, 2013

(65) Prior Publication Data

US 2014/0282079 A1   Sep. 18, 2014

(51) Int. Cl.
  *H04L 12/58*   (2006.01)
  *G06F 3/01*   (2006.01)
(52) U.S. Cl.
  CPC . *H04L 51/16* (2013.01); *G06F 3/01* (2013.01)
(58) Field of Classification Search
  CPC .................................. H04L 51/16; G06F 3/01
  USPC .......................................................... 715/752
  See application file for complete search history.

(56) References Cited

U.S. PATENT DOCUMENTS

| | | | | |
|---|---|---|---|---|
| 6,636,240 | B1 * | 10/2003 | Centerwall et al. | 715/752 |
| 8,209,339 | B1 | 6/2012 | Tong | |
| 8,225,219 | B2 * | 7/2012 | Edelen et al. | 715/753 |
| 8,244,036 | B2 | 8/2012 | Hartmann et al. | |
| 2002/0002567 | A1 * | 1/2002 | Kanie et al. | 707/513 |
| 2002/0073157 | A1 * | 6/2002 | Newman et al. | 709/206 |
| 2006/0101350 | A1 * | 5/2006 | Scott | 715/779 |
| 2008/0310736 | A1 * | 12/2008 | Chattopadhyay et al. | 382/218 |
| 2009/0216843 | A1 * | 8/2009 | Willner et al. | 709/206 |

* cited by examiner

*Primary Examiner* — William Bashore
*Assistant Examiner* — Gregory A Distefano
(74) *Attorney, Agent, or Firm* — Kunzler Law Group

(57) ABSTRACT

A difference between a source email message and at least one target email message is determined and then displayed in a popup window. A first selected message in a message thread is designated as a source message. The thread is searched for a target message that comprises a next oldest message in the thread. Identifying data in the source message is compared to identifying data in the target message for generating difference data. Content of both the source message and target message is also compared. A popup window is generated over the target message and the content difference is displayed in the popup window.

12 Claims, 8 Drawing Sheets

DISPLAYING MESSAGE CONTENT DIFFERENTIAL IN POPUP WINDOW

BACKGROUND

The present invention relates generally to electronic mail communications and, more specifically, to a system for displaying differences in content between email messages in an email thread.

Electronic mail, most commonly referred to as e-mail or email, is a method of exchanging digital messages from an author to one or more recipients. Email operates across computer networks ranging from local area networks (LAN) to broad-ranging networks, such as the Internet. Email provides a quick and efficient means for people to electronically communicate, whether they are located in the same building or thousands of miles apart.

Early email systems typically required the author and recipient to be online simultaneously, similar to today's instant messaging. Current email systems are based on a "store-and-forward" model, where a message is sent to an intermediate station where it is kept and sent at a later time, typically only milliseconds, to the final destination or to another intermediate station. The intermediate station is typically a node that verifies the integrity of the message before forwarding it. Thus, in "store-and-forward" communications, an email server accepts, forwards, delivers and may store messages. Neither the users nor their computers are required to be online, i.e. connected to a network, simultaneously. The users only need to briefly connect to the network, typically to an email server, for as long as it takes to send or receive messages.

Email messages typically consists of three components: a message envelope, message header, and message body. The message envelope is where a message or data is encrypted into a data packet. Thus, encrypting data and/or the body of the message provides an "electronic" envelope for the data and/or the body of the message. The message envelope is a portion of the internal process by which email is routed.

The message header contains control information, and often descriptive information as well. Control information in a message header frequently includes: "FROM", which is an originator's email address; "TO", which is one or more recipient email addresses to which the message is intended; and "DATE" where the message is date and time stamped by a mail transfer agent that facilitates the transfer of the email message from one computer to another. Optional header information includes: "SUBJECT", which indicates an intended subject of the email and "CC", where recipients other than a main recipient of the email message, receive an electronic "Carbon Copy" of the message, though the content of the message may not be directed toward them.

The message body of an email message is the actual content of the message contained in the email. The body of the email message contains actual and arbitrary data such as text or images created by the user. The message body may be created using plain text or HTML (HyperText Markup Language).

Conversation threading is a feature used by many email clients, bulletin boards, newsgroups, and Internet forums. An "email thread" is an email message and a running list of all subsequent reply messages pertaining to the original email message. The original email message and subsequent reply messages are most commonly organized in chronological order, and recipients and/or other participants in the email thread may refer to or re-post snippets from earlier parts of the commentary for clarification. Email software is used to group email messages into threaded views to aid users by visually grouping messages. Email messages may be grouped in a hierarchy by subject and time sent or received, with replies to a message arranged visually near to the original message.

However, it is a common occurrence that email threads contain long-running discussions pertaining to a common subject. A sender sends a particular query, statement, or other data in an email message and replies by multiple recipient's continue the email thread. Many of the replies by the recipients to the original email message may be very brief, and they require the sender and other recipients to open the actual email to view the brief response. This can be time consuming and unproductive for users, particularly when there are substantial number of recipients or responses.

A known effort to identify unique content in interrelated email messages includes comparing follow-on email messages, such as replies or forwards, to the original email message. Which part of a follow-on message is not present in the original message and is a unique part of the follow-on message is determined. The comparison includes parsing of the messages to extract user viewable parts for determination of which extracted part is the last message part containing unique information. Once the unique message part is determined, the message body that excludes everything after the unique part, including the headers, may be displayed. A disadvantage of this method is that the email messages must be opened, to determine the unique part of subsequent messages, and thus is still time consuming.

BRIEF SUMMARY

In one general embodiment, a method includes designating a selected message in a message thread as a source message, searching the message thread for a target message, and determining a difference between the source message and target message. The method continues with generating difference information indicating the difference between the source message and target message; and displaying the difference information in a popup window.

In another general embodiment a method includes designating a first selected email message in an email message thread as a source email message, determining if more than one email message is selected, and if it is determined that more than one email message is not selected then, searching the email message thread for a target email message. Searching the email message thread comprises searching identifying data in each email message of the email message thread and comparing the identifying data of each email message, for determining a next oldest email message in the email message thread. The next oldest email message comprises the target email message. The method then continues with comparing content of the source email message to content of the target email message for generating content difference. A popup window is then generated over the target email message and the content difference is displayed in the popup window.

In further general embodiment, a system that includes a pointer displayable on a display and a processor coupled to the pointer. The system designates a first selected email message in an email thread as a source email message and determines if more than one email message is selected. If it is determined that more than one email message is not selected then, the processor searches the email message thread for a target email message. Searching the thread comprises reading identifying data in each email message of the email message thread and comparing the identifying data of each email message for determining a next oldest email message in the email message thread, the next oldest email message comprising the target email message. The system further compares content of the source email message to content of the target email message for generating content difference and displaying the content difference in a popup window. If it is determined that more than one email message is selected then, the system designates a second selected email message as a first target email message and designates subsequent selected email messages as subsequent target email messages. Content of the first target email message is then compared to the content of the source email message for generating content difference, and a popup window is generated and the content difference is displayed in the popup window. The system then compares content of each subsequent target email message to the content of the source email message for generating content difference, and generates a popup window and displays the content difference in the popup window.

In further general embodiment, a computer program product that comprises a computer usable medium having computer usable program code embodied therewith. The computer usable program code comprises computer usable program code configured to determine a difference between a source email message and at least one target email message and display the difference in a popup window. The computer usable program code comprises computer usable program code configured to designate a first selected email message in an email message thread as a source email message and computer usable program code configured to determine if more than one email message in the thread is selected. If it is determined that more than one email message is not selected then, computer usable program code configured to search the thread for a target email message. Searching the email message thread comprises computer usable program code configured to read identifying data in each email message in the email message thread, computer usable program code configured to compare the identifying data of each email message for determining a next oldest email message in the thread, where the next oldest email message comprises the target email message, and computer usable program code configured to compare content of the target email message with content of the source email message for generating content difference. The computer usable program code then comprises computer usable program code configured to generate a popup window and display the content difference in the popup window. If it is determined that more than one message is selected then, computer usable program code configured to designate a second selected email message as a first target email message and designate subsequent selected email messages as subsequent target email messages, and computer usable program code configured to compare content of the first target email message to the content of the source email message for generating content difference. The computer usable program code then comprises computer usable program code configured to generate a popup window and display the content difference in the popup window, computer usable program code configured to compare content of each subsequent target email message to the content of the source email message for generating content difference, and computer usable program code configured to generate a popup window and displaying the content difference in the popup window.

DETAILED DESCRIPTION

Figure 1:
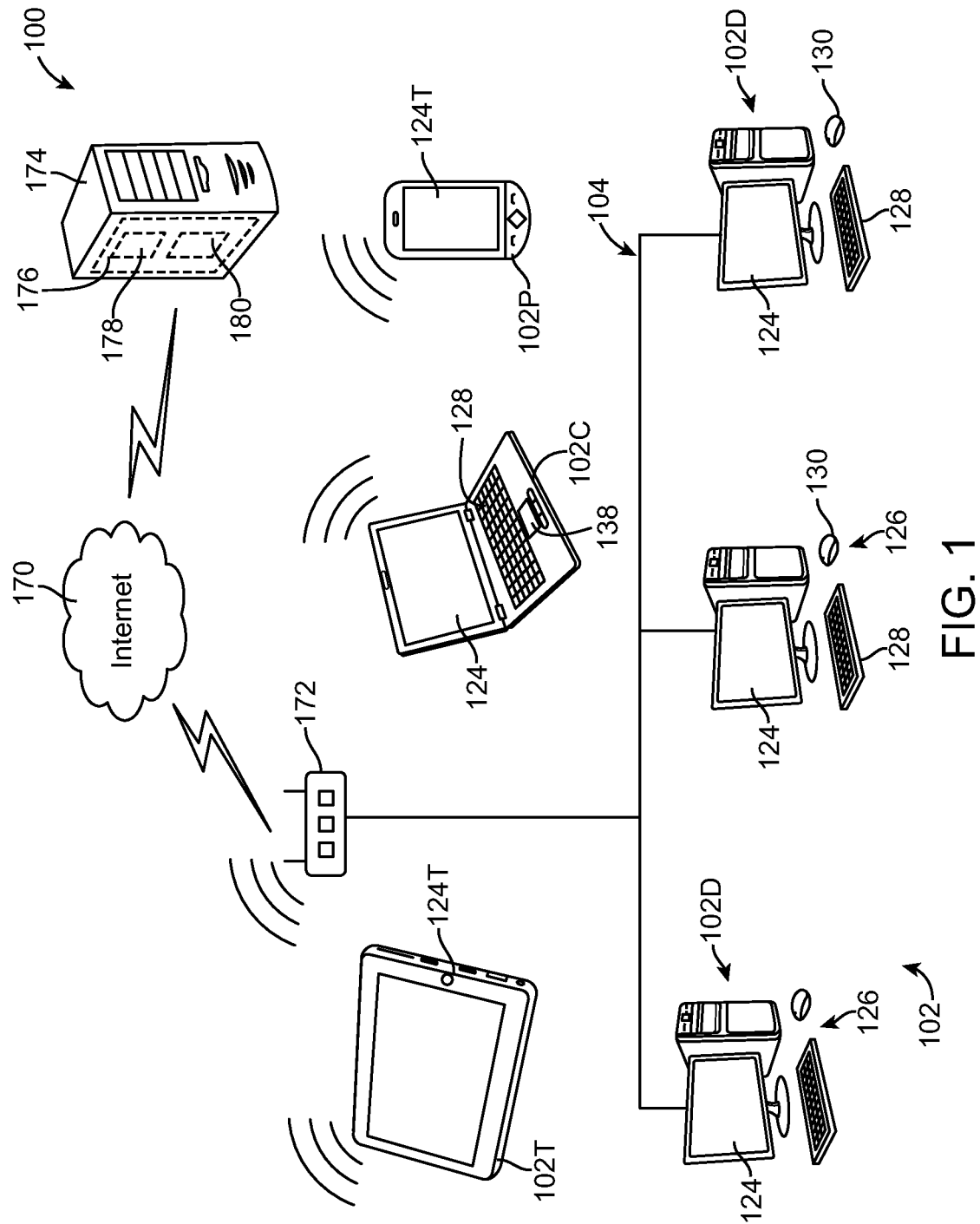
FIG. 1 is a functional block diagram showing an exemplary embodiment of a system of the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

In one general embodiment, a method includes designating a selected message in a message thread as a source message, searching the message thread for a target message, and determining a difference between the source message and target message. The method continues with generating difference information indicating the difference between the source message and target message; and displaying the difference information in a popup window.

In another general embodiment a method includes designating a first selected email message in an email message thread as a source email message, determining if more than one email message is selected, and if it is determined that more than one email message is not selected then, searching the email message thread for a target email message. Searching the email message thread comprises searching identifying data in each email message of the email message thread and comparing the identifying data of each email message, for determining a next oldest email message in the email message thread. The next oldest email message comprises the target email message. The method then continues with comparing content of the source email message to content of the target email message for generating content difference. A popup window is then generated over the target email message and the content difference is displayed in the popup window.

In further general embodiment, a system that includes a pointer displayable on a display and a processor coupled to the pointer. The system designates a first selected email message in an email thread as a source email message and determines if more than one email message is selected. If it is determined that more than one email message is not selected then, the processor searches the email message thread for a target email message. Searching the thread comprises reading identifying data in each email message of the email message thread and comparing the identifying data of each email message for determining a next oldest email message in the email message thread, the next oldest email message comprising the target email message. The system further compares content of the source email message to content of the target email message for generating content difference and displaying the content difference in a popup window. If it is determined that more than one email message is selected then, the system designates a second selected email message as a first target email message and designates subsequent selected email messages as subsequent target email messages. Content of the first target email message is then compared to the content of the source email message for generating content difference, and a popup window is generated and the content difference is displayed in the popup window. The system then compares content of each subsequent target email message to the content of the source email message for generating content difference, and generates a popup window and displays the content difference in the popup window.

In further general embodiment, a computer program product that comprises a computer usable medium having computer usable program code embodied therewith. The computer usable program code comprises computer usable program code configured to determine a difference between a source email message and at least one target email message and display the difference in a popup window. The computer usable program code comprises computer usable program code configured to designate a first selected email message in an email message thread as a source email message and computer usable program code configured to determine if more than one email message in the thread is selected. If it is determined that more than one email message is not selected then, computer usable program code configured to search the thread for a target email message. Searching the email message thread comprises computer usable program code configured to read identifying data in each email message in the email message thread, computer usable program code configured to compare the identifying data of each email message for determining a next oldest email message in the thread, where the next oldest email message comprises the target email message, and computer usable program code configured to compare content of the target email message with content of the source email message for generating content difference. The computer usable program code then comprises computer usable program code configured to generate a popup window and display the content difference in the popup window. If it is determined that more than one message is selected then, computer usable program code configured to designate a second selected email message as a first target email message and designate subsequent selected email messages as subsequent target email messages, and computer usable program code configured to compare content of the first target email message to the content of the source email message for generating content difference. The computer usable program code then comprises computer usable program code configured to generate a popup window and display the content difference in the popup window, computer usable program code configured to compare content of each subsequent target email message to the content of the source email message for generating content difference, and computer usable program code configured to generate a popup window and displaying the content difference in the popup window.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of describing the embodiments disclosed herein, two elements are considered to be coupled when one element is able to send an electrical signal to another element. The electrical signal may represent, for example but not limited to, data, operating commands, status information, or electrical power, or any combination of these electrical signals. A coupling may be implemented by wired or wireless connection means.

Referring now to FIG. 1 there is shown, generally at 100, an exemplary embodiment of a system for displaying differences in content between email messages in an email thread. The system 100 may include computing devices, shown generally at 102, connected to a network 104. The computing devices 102 may comprise different known computing devices that couple to the network 104 to exchange data between devices 102 via the network 104. In exemplary embodiments, the computing devices 102 may include desktop computers 102D and mobile computing devices, such as a laptop computers 102L, tablet computers 102T, or smartphones 102P. Only one of each mobile computing device 102L, 102T, 102P is shown for ease of discussion only. In the embodiments, the computing devices 102 may comprise known desktop computers, laptop computers, notebook computers, tablet computers, smartphones, or any suitable computing devices capable of connecting to the network 104 and for sending and receiving data between the devices 102 via the network 104.

Figure 2:
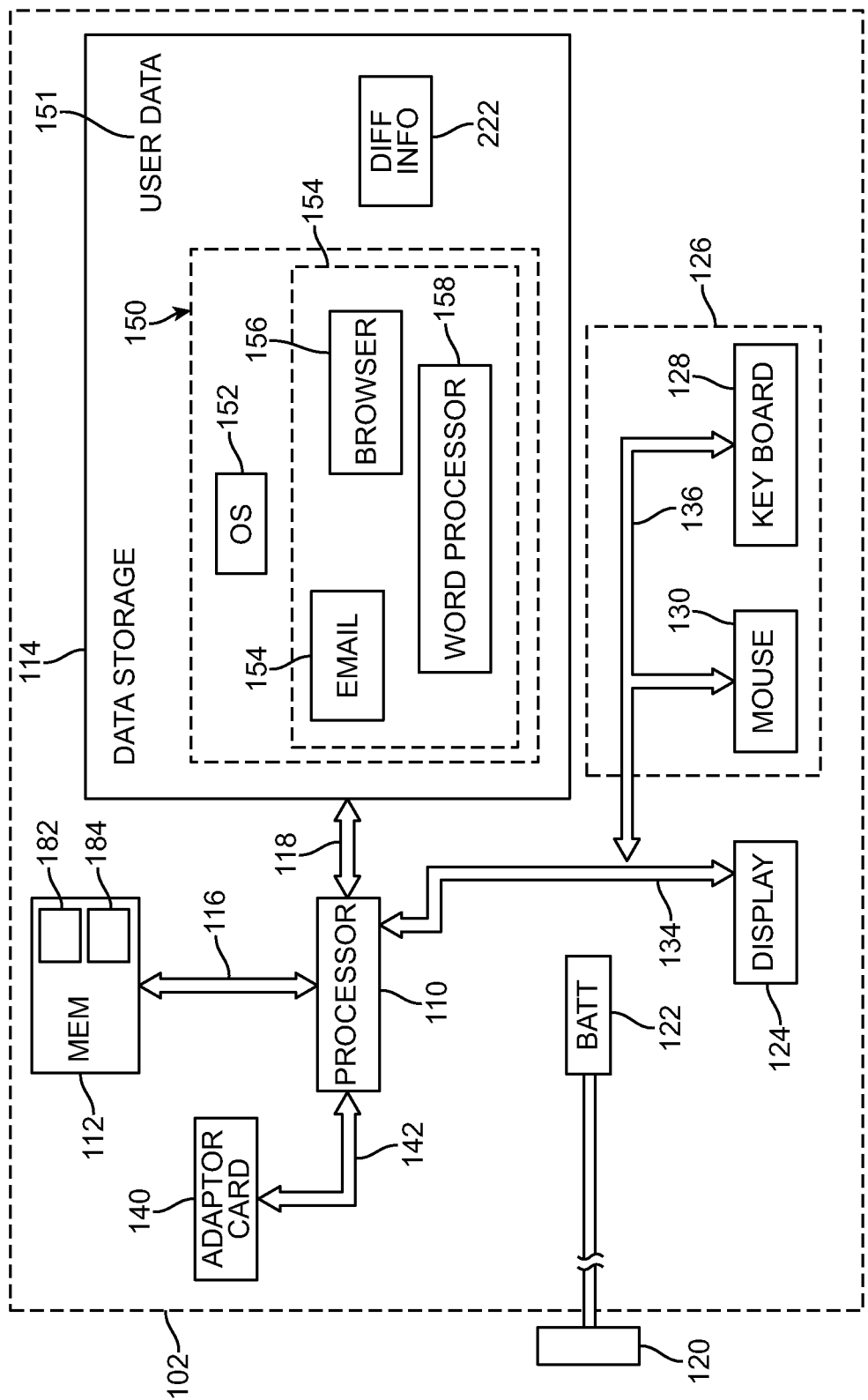
FIG. 2 illustrates is a simplified block diagram of a computing device in accordance with an embodiment of the invention.

Referring FIG. 1 and FIG. 2, and particularly to FIG. 2, in general embodiments, each computing device 102 comprises a processor 110 for processing data, a memory 112, and a nonvolatile data storage device 114. In some embodiments, the processor 110 is connected to the memory 112 via memory data and address lines 116 and to the nonvolatile data storage device 114 by a data bus 118. The memory 112 may comprise known volatile memory devices, such as dynamic random-access memory (DRAM), for temporary data storage. In embodiments where the computing devices 102 comprises desktop computers 102D or laptop computers 102L, the nonvolatile data storage device 114 may comprise a known disk drive, such as a hard disk drive or solid state disk drive, suitable for permanent data storage. In embodiments where the computing devices comprise mobile computing devices, such as tablets 102T or smartphones 102P, the memory 112 may comprise a flash memory device that may provide both volatile and nonvolatile data storage, as known.

In desktop computer 102D embodiments, the computer 102 couples to a power source 120 to provide power to the computer 102. In optional embodiments, where the computing device comprises laptop computers 102L, tablets 102T, or smartphones 102P, a power source 122 may comprise a rechargeable battery, as known in the art.

In the embodiments, to facilitate data entry and manipulation, the computing devices 102, desktop computers 102D, tablets 102T, and smartphones 102P are each provided with a display 124 for viewing data and at least one data manipulation/data entry device, shown at 126. In some embodiments, the desktop computers 102D are provided with a keyboard 128 and a pointing device, such as a mouse 130 for moving a pointer 132 (shown in FIGS. 3-5) enabling data input and manipulation. The processor 110 is connected to the display 124 via data lines 134, and to the keyboard 128 and mouse 130, via data lines 136. In optional embodiments, the processor 110 may wirelessly connect to the keyboard 128 and mouse 130.

In embodiments where the computing devices 102 comprise tablets 102T or smartphones 102P, the display 124 may comprise a touchscreen display 124T, where users may use their fingers to input and manipulate data using the touchscreen 124T. In optional embodiments, the laptop computer 102L may be configured with a touchscreen display 124T as well as a keyboard 128. Additionally, in some embodiments, the laptop 102L may further include a touchpad 138 for moving the pointer 132 about the display screen 124 for data input and manipulation, similar to the mouse 130.

In optional embodiments, the laptop 102L, tablet 102T, and smartphone 102P may include an adaptor card 140 connected to the processor 110 via data bus 142. The adaptor card 140 is provided for connecting the laptop 102L, tablet 102T, and smartphone 102P to other computing devices 102 to the network 104. In the embodiments, the adaptor card 140 may comprise a wireless network interface controller card for connecting the computing device 102L, 102T, 102P wirelessly to the network 104. The adaptor card 140 may comprise a Wi-Fi® transmitter/receiver for data transmission between the computing devices 102L, 102T, 102P and network 104, as well as other networks such as the Internet 170 (thoroughly discussed hereinafter). "Wi-Fi" is a trademark of Wi-Fi Alliance, Austin, Tex. In such an embodiment, the adaptor card 140 communicates with the network 104 wirelessly using radio frequency signals.

Typically, one or more computer programs, shown generally at 150, as well as user data 151, are stored in the storage device 114 or memory 112. One exemplary computer program comprises an operating system (OS) 152 that is controlled by the processor 110. The operating system 152 manages the computer's memory 112 and storage device 114, and provides services for application programs, shown at 154, as is known. Exemplary application programs, or application 154 may include an email application 156, an Internet browser application 158, and a word processing application 160, amongst numerous well-known applications.

As illustrated in FIG. 1, in some embodiments, the network 104 interconnecting the computing devices 102 may comprise a known local area network (LAN) where the computing devices 102 are located in a limited area such as a school or office building. In optional embodiments, the network 104 may comprise a wide area network (WAN). In WAN embodiments, the network 104 may span broad areas, including metropolitan areas, regions of countries, or across national boundaries. WANs use private or public network transports, as known. Additionally, the network 104 may comprise both LAN and WAN networks, where the WAN provides connectivity between remotely located LAN networks 104. In the embodiments, the network 104 may provide connectivity to a global network, or system of networks, such as the Internet 170. The network 104 may connect to the Internet 170 via wired connections or wirelessly, via a known wireless router 172. In the embodiments, remotely located LAN and WAN networks may be connected via the Internet 170.

The Internet 170 carries an extensive range of information resources and services, including the infrastructure to support email. Thus, a plurality of email servers 174 (one of which is shown for ease of discussion only) are interconnected to the Internet 170. In some embodiments, the email server 174 comprises a computer server connect to the network 104 via the Internet 170. The email server 174 may be connected directly to the network 104, in some embodiments. Optionally, the email server 174 may comprise a plurality of email servers 174, some of which are connected directly to the network 104, while other servers 174 connect to the network 104 via the Internet 170.

In the embodiments, the email mail server 174 comprises a storage area 176 where e-mail is stored for users and a database 178, stored on the storage area 176. The storage area 176 may comprise a plurality of storage devices, such as a known RAID system, providing terabytes of data storage. The database 178 comprises a database of user accounts that the server 174 recognizes and processes. The email mail server 174 also comprises a communications module 180 that controls the transfer of email messages to and from other mail servers 174.

Figure 3:
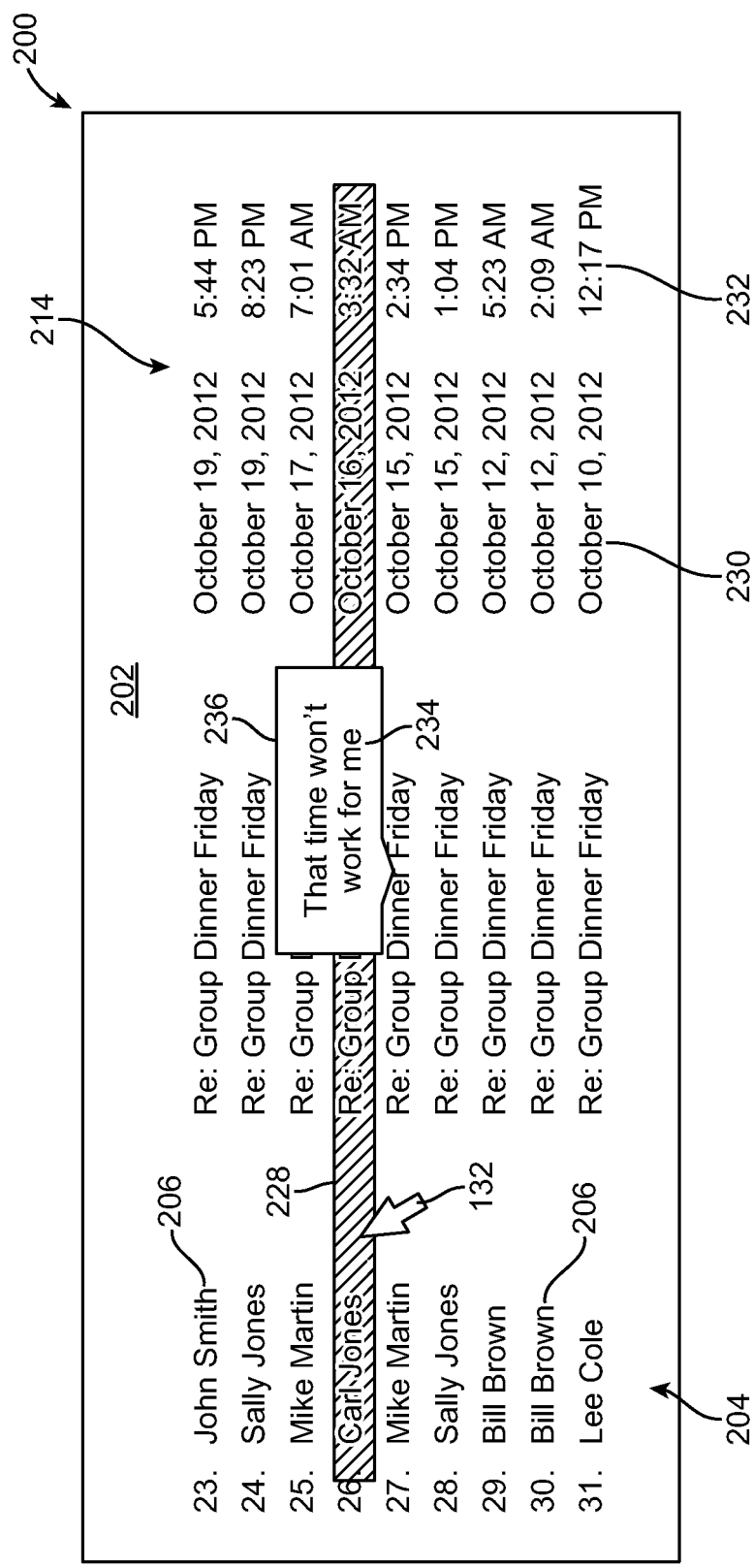
FIG. 3 illustrates an exemplary screenshot where a difference between email messages in an email thread is displayed in accordance with an embodiment of the invention.

Referring now to the drawing Figures, and particularly to FIGS. 3-7, a series of screenshots and exemplary email messages according to the embodiments are illustrated. A first exemplary screenshot 200, which may comprise a Graphical User Interface (GUI) 202 portion of the email application program 156, is shown in FIG. 3. The GUI 202 of the email application program 156, email program 156 hereinafter for ease of discussion only, may be invoked by a user (not shown) operating one any of the computing devices 102 discussed previously. The GUI 202 shown in the screenshot 200 may display all or a portion of an email thread 204 of email messages 206. It is assumed in the following discussion that the email thread 204 shown in the screenshot 200 is a partial email thread 204, for ease of discussion only. The email thread 204 shown includes email messages; hereinafter emails 206, numbered 23 through 31, of a presumed longer email thread 204, of the subject "Group Dinner Friday."

Figure 4:
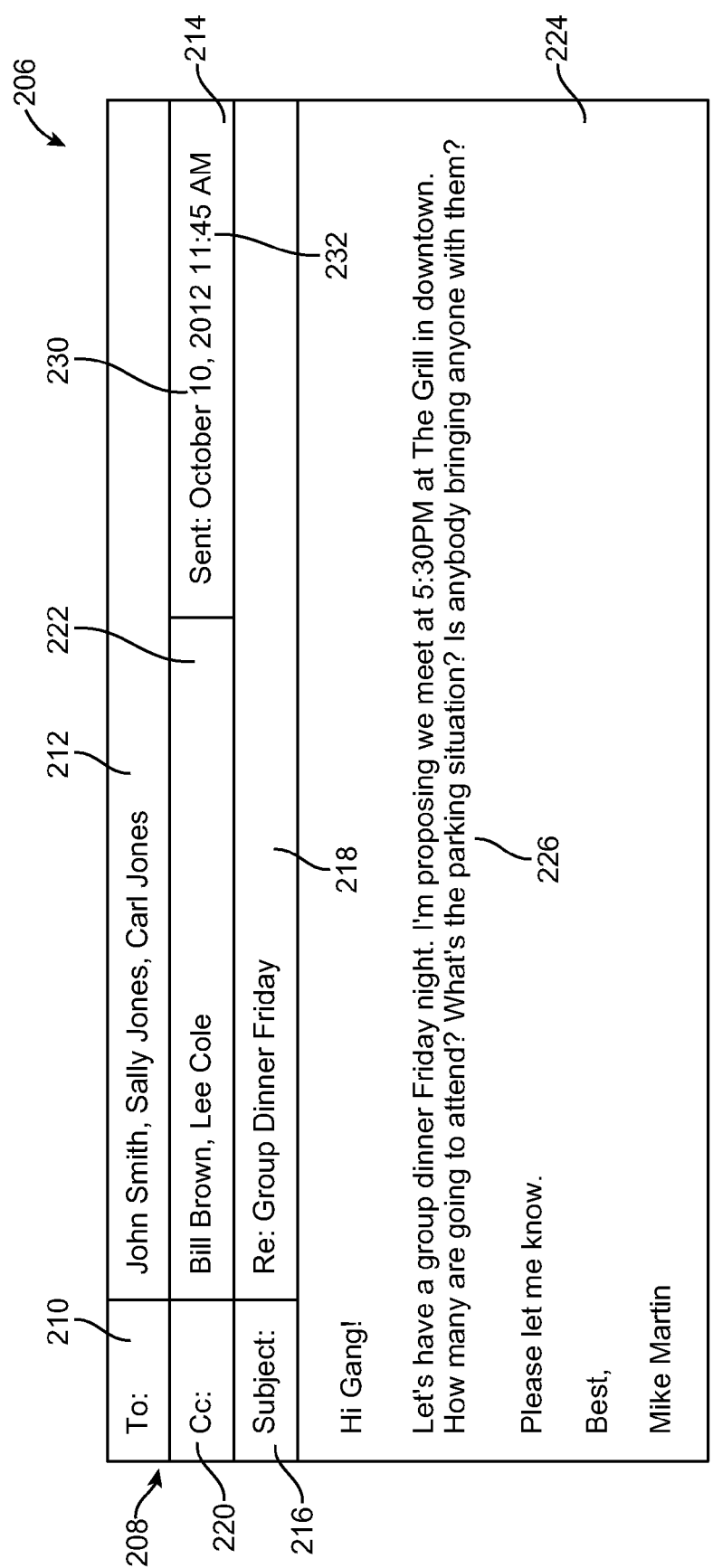
FIG. 4 illustrates an exemplary email message in an email thread.

As illustrated in FIG. 4, an exemplary email 206 is shown that includes message header, shown generally at 208, that includes control and descriptive information. The message header 208 may include TO 210 which is one or more recipient email addresses 212 to which the message is intended; and a time stamp 214 where the message is date and time stamped by a mail transfer agent that facilitates the transfer of the email message 206 from one computer 102 to another. In optional embodiments, the message header 208 may also include a SUBJECT field 216, which indicates an intended subject 218 of the email 206 and a CC field 220, where recipients 222 other than the main recipients 212 of the email message 206, receive an electronic Carbon Copy of the email 206.

The email 206 also includes a message body 224 that comprises the content of the message contained in the email 206. The message body 224 may comprise contains actual and arbitrary data such as text 226 or images (not shown) created by the user. The message body 224 may be created using plain text or HTML (HyperText Markup Language), as known in the art.

In the prior art, if a user desired to view the difference between emails 206 in the email thread 204, the user would have to "mouseover" the desired email 206. A "mouseover" refers to the user positioning the pointer 132 over the desired email 206 using the mouse 130 or other pointing device. In a mouseover, also known in the art as a "mouse hover", or "hover box" a section of the GUI 202 of the computer application program is raised when the user moves or "hovers" the pointer 132 over a particular area of the GUI 202, using the mouse 130. Once the user positions their pointer 132 over the desired email 206, they then would either click or double-click on the email 206 using their mouse 130, or other pointing device, to either select or open the email 206, and view the message body 224.

After positioning the pointer 132, the user presses a button mouse (not shown) or other known actuation switch, commonly referred to as "clicks", to select or interact with the desired an element of the GUI 202. Thus, the user first positions the pointer 132 over a desired email 206, then clicks on the email 206 to select it and then click it again to open the email 206 and view the message body 224. Opening an email 206 involves double-clicking (clicking on the mouse button twice in rapid succession) on the desired email 206 to generate a secondary window (not shown) in the GUI 202 to display the message body 224 of the email 206. The user then responds to the email 206 as desired.

In the exemplary embodiment shown in FIG. 3, the system 100 first determines if a mouseover is detected. If a mouseover is detected, the system 100 determines if an email thread 204 is beneath the mouse pointer 132. As shown in the first screenshot 200, a mouseover is detected over email No. 26, where the pointer 132 is positioned over email No. 26, and it determined there is an email thread 204 is beneath the mouse pointer 132, of which email No. 26 is part. Email No. 26 is then selected, shown by highlighting 228 in the first screenshot 200.

The system 100 then determines if more than one email 206 is selected. If only one email 206 is selected, as illustrated in the first screenshot 200, the system 100 assigns the selected email, email No. 26 as "SOURCE" email. The system 100 then searches for a next oldest email 206 in the thread 204. A next oldest email 206 is determined by identifying information provided in each email 206 in the thread. In some embodiments, the identifying information includes information contained in the message header 208 of the SOURCE email and other emails 206 in the thread 204, such as metadata (not shown), the time stamp 214, and other information associated with the emails 206 in the thread 204.

As emails 206 are received, the computing device 102 assigns the time stamp 214 to each email 206. In the embodiments, the time stamp 214 may include a date 230 that the email 206 as well as a time of day 232 the email 206 was received. In the exemplary first screenshot 200, email No. 26 is selected and has a time stamp 214 of "Oct. 16, 2012 3:32 AM", a next oldest email message in the thread 204 is email No. 27, with a time stamp 214 of "Oct. 15, 2012 2:34 PM". Since email No. 27 is the next oldest email in the thread 204, email No. 27 is designated as "TARGET" email.

Figure 5:
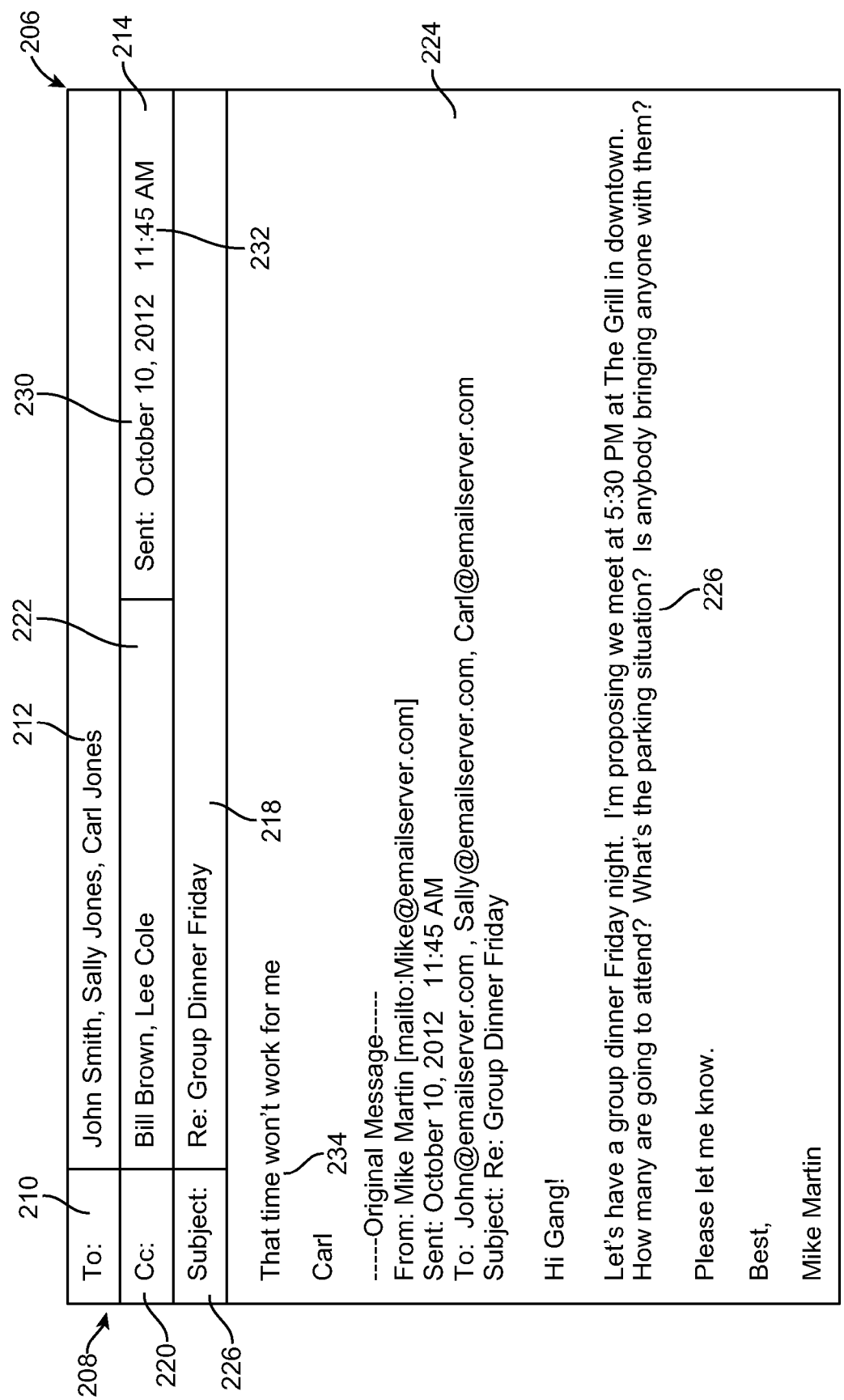
FIG. 5 illustrates an exemplary response email message to another email message in an email thread.

Referring to FIGS. 3-5, the system 100 then reads data from the message body 224 of the SOURCE email No. 26 into a buffer 182 in memory 112 (best seen in FIG. 2). Once the body 224 of the SOURCE email is read into the buffer 182, the body 224 of the TARGET email No. 27 is then read into the buffer 182. Next, the system 100 performs a difference comparison between the content of the body of the SOURCE email No. 26 and TARGET email No. 27 to generate difference information 234. Any difference between the data contained in the body of the SOURCE email No. 26 and TARGET email No. 27 comprises difference information 234. The difference information 234 is then stored in a DIFF buffer 184 in memory 112.

The system 100 then determines an amount of data that the difference information 234 comprises. In one exemplary embodiment, the system 100 may determine the number lines of text 226 that the difference information 234 comprises. Optionally, alternative known methods may be used for determining the amount of data that the difference information 234 comprises. Once the amount of data the difference information 234 comprises is determined, the system 100 determines if the difference information 234 is greater than a maximum amount of data displayable in a popup window 236. The maximum amount of data displayable in the popup window 236 is purely arbitrary. In optional embodiments, the user specifies the maximum amount of data to be displayed in the popup window 236. However, it is well known that in an email thread 204 many of the reply emails 206 to an originating email 206 are succinct and comprise very few lines of text. Thus the difference information 234 may comprise a relatively small amount of data.

If it is determined that the difference information 234 is equal to or less than the maximum amount of data displayable in the popup window 236, then the popup window 236 is generated and displayed on the GUI 202. As illustrated in the exemplary screenshot 200 and in FIG. 5, the difference information 234 comprises "That time won't work for me." and is displayed in the popup window 236. In the embodiments, the popup window 236 is displayed on the GUI 202 at a location over the displayed email thread 204. In preferred embodiments, the popup window 236 is displayed over the TARGET email No. 27 in the screenshot 200. Displaying the popup window 236 over the TARGET email No. 27, quickly indicates to the user what the difference information 234 is between the SOURCE email No. 26 and TARGET email No. 27. Thus, the user can quickly and easily ascertain what the difference information 234 is between the SOURCE and TARGET emails 206, without the need to open each email 206 to view the message body 224 and read though the text 226 to determine what the difference information 234 between the SOURCE and TARGET emails 206.

In exemplary embodiments, the popup window 236 is configured to display a relatively small amount of data, such as a limited number of lines of text 226. Configuring the popup window 236 to display a small amount of data, such as a limited number of lines of text 226, provides a popup window 236 which is easily viewable by the user and which is unobtrusive to the GUI 202. Additionally, limiting the number of lines of text 226 displayed in the popup window 236 provides a popup window 236 having reduced dimensions, allowing emails 206 adjacent the popup window 236 to be viewable by the user, as illustrated in the first screenshot 200.

In the embodiments, if it is determined that the difference information 234 is greater than a maximum displayable amount of data in a popup window 236, the system 100 provides alternatives for the difference information 234. Initially, the system 100 presents a warning notifying the user that the difference information 234 is greater than a maximum amount of data displayable in the popup window 236. In some embodiments, if the difference information 234 is greater than the maximum amount of data, the difference information 234 is written to a difference file 222 on the data storage device 114. The difference information 234 may then be read from the difference file 222 at a later time by the user. In some alternative embodiments, once the difference information 234 is determined by the system 100, the difference information 234 is written to the difference file 222 on the data storage device 114. Writing the difference information 234 to the difference file 222 may reduce the time needed for the system 100 to generate the popup window 236 and display the difference information 234 in the window 236.

Optionally, the user may elect to open the SOURCE email No. 26 and TARGET email No. 27 and view the body 224 of each email 206 to ascertain the differences between the two. In alternative embodiments, the user may request the difference information 234 to be displayed in the popup window 236, even though the difference information 234 exceeds the determined maximum amount of data displayable in the popup window 236. In this embodiment, the dimensions of the popup window 236 are increased to contain the difference information 234.

In the exemplary embodiment shown in FIG. 6, the system 100 again first determines if a mouseover is detected and if an email thread 204 is beneath the mouse pointer 132, as shown in a second screenshot 300. In the second screenshot 300, a mouseover is detected over email No. 24 where the pointer 132 is positioned, in the email thread 204. The email No. 24 is then selected, shown by highlighting 228 in the second screenshot 300. The system 100 then determines if more than one email 206 is selected. A second email, email No. 29 is shown highlighted 208, indicating it is also selected.

As the mouseover is detected over email No. 24, the system 100 assigns the email No. 24 as the SOURCE email and email No. 29 is designated as the TARGET email. The system 100 then reads data from the message body 224 of the SOURCE email No. 24 into buffer 182, and then reads the message body 224 of the TARGET email No. 29 into the buffer 182. The system 100 then performs a difference comparison between the content of the message body 224 of the SOURCE email No. 24 and TARGET email No. 29 to generate difference information 234, as previously discussed. Any difference information 234 is then stored in the DIFF buffer 184 in memory 112.

It is then determined if the difference information 234 is displayable in the popup window 236. If it is determined that the difference information 234 is displayable in the popup window 236, the popup window 236 is generated and displayed over the TARGET email No. 29. If it is determined that the difference information 234 is not displayable in the popup window 236, then system 100 provides alternatives, as discussed previously.

Figure 6:
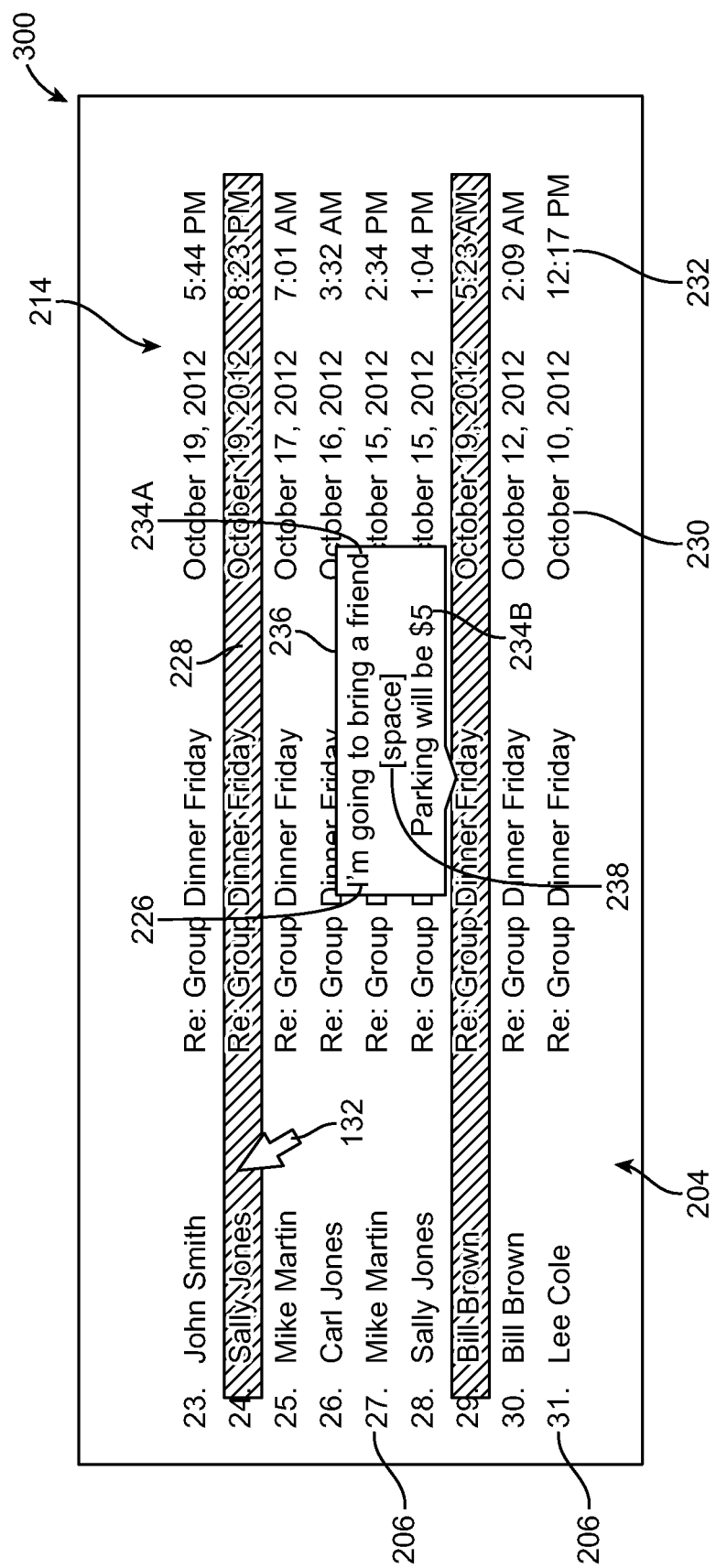
FIG. 6 illustrates an exemplary screenshot where a difference between more than one email message in an email thread is displayed in accordance with an embodiment of the invention.
Figure 7:
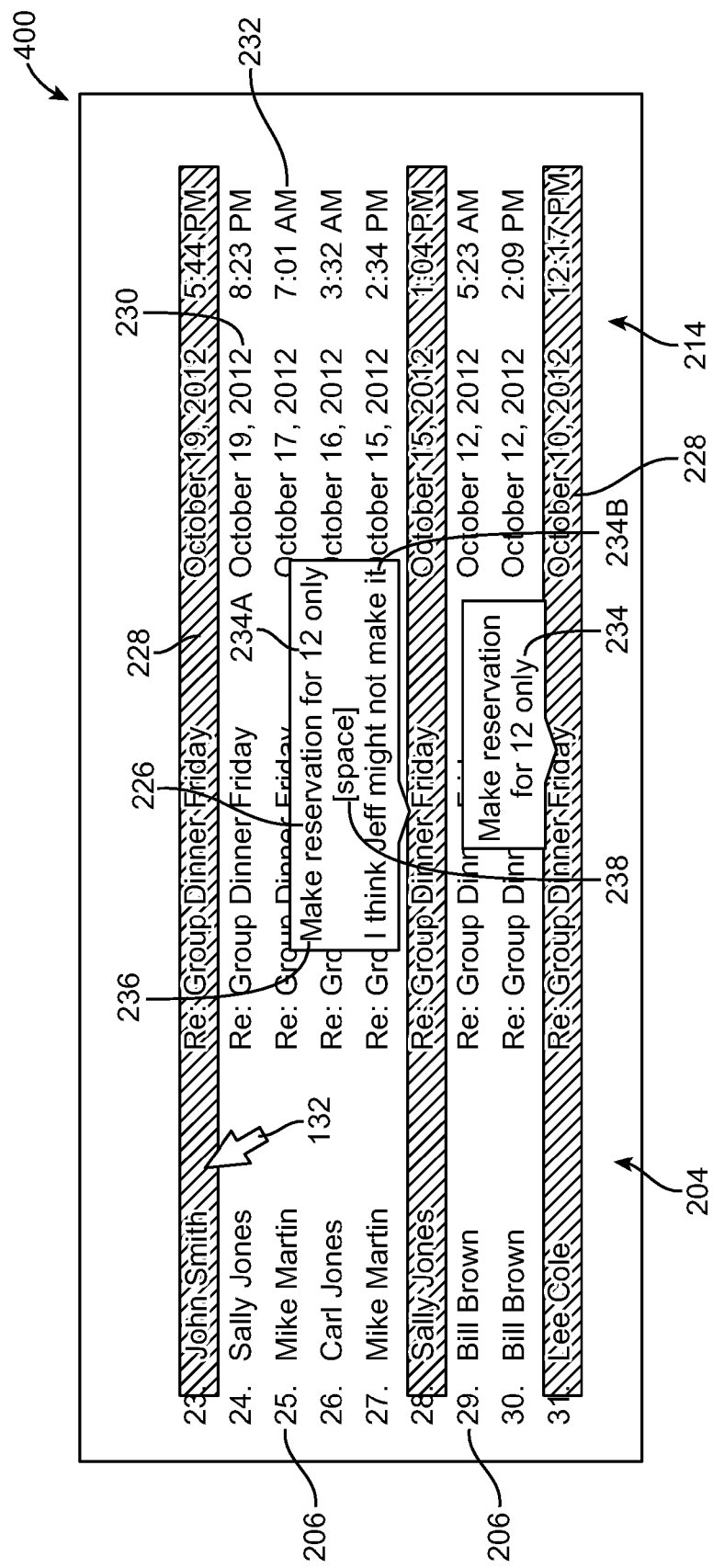
FIG. 7 illustrates an exemplary screenshot where a difference between multiple email messages in an email thread is displayed in accordance with an embodiment of the invention.

As illustrated in FIG. 6, a space 238 may be positioned between adjacent lines of text 226. Positioning a space 238 between adjacent lines of text 226 indicates two sets, difference information 234A and difference information 234B, of difference information 234 between the SOURCE email No. 24 and TARGET email No. 29 were determined by the system 100. One set of difference information 234A is generated by user "Sally Jones" who generated the SOURCE email No. 24 and the second set of difference information 234B shows difference information between the SOURCE email No. 24 and TARGET email No. 29.

In the exemplary embodiment shown in FIG. 7, the system 100 again first determines if a mouseover is detected and if an email thread 204 is beneath the mouse pointer 132, as shown in a third screenshot 400. In the third screenshot 400, a mouseover is detected over email No. 23 where the pointer 132 is positioned in the email thread 204. Email No. 23 is selected, shown by highlighting 228 in the third screenshot 400. The system 100 then determines if more than one email 206 is selected. A second email, email No. 28 is shown highlighted 208, indicating it is also selected, as well as a third email, email No. 31 is also highlighted 208, indicating it is also selected.

As the mouseover is detected over email No. 23, the system 100 assigns the email No. 23 as the SOURCE email. However, since both email No. 28 and email No. 31 are selected, the system 100 designates one of email No. 28 and email No. 31 the TARGET email and the second email as a subsequent TARGET email. In the embodiment shown in FIG. 5, the system 100 may determines the TARGET email and subsequent TARGET email arbitrarily. In optional embodiments, the system 100 may determine the TARGET email and subsequent TARGET email by identifying information provided in each email 206, such as the time stamp 214 associated with each email 206, as discussed previously.

In the embodiments, once the TARGET email and subsequent TARGET email are determined, the system 100 reads data from the message body 224 of the SOURCE email No. 23 into buffer 182, and then reads the data from the message body 224 of the TARGET email No. 28 into the buffer 182. The system 100 then performs a difference comparison between the content of the message body 224 of the SOURCE email No. 23 and TARGET email No. 29 to generate difference information 234, as previously discussed. Any difference information 234 is then stored in the DIFF buffer 184 in memory 112.

The system 100 then determines if the difference information 234 is displayable in the popup window 236. If it is determined that the difference information 234 is displayable in the popup window 236, the popup window 236 is generated and displayed over the TARGET email No. 29. If it is determined that the difference information 234 is not displayable in the popup window 236, then system 100 provides several different alternative destinations for the difference information 234, as discussed previously. As illustrated in FIG. 5, a space 238 may be positioned between adjacent lines of text 226, indicating two sets of difference information 234A, 216B between the SOURCE email No. 23 and TARGET email No. 28, as discussed above.

The system 100 reads data from the message body 224 of the SOURCE email No. 23 into buffer 182, and reads the data from the message body 224 of the subsequent TARGET email No. 31 into the buffer 182. The system 100 then performs a difference comparison between the content of the message body 224 of the SOURCE email No. 23 and subsequent TARGET email No. 31 to generate difference information 234, as previously discussed. Any difference information 234 is then stored in the DIFF buffer 184 in memory 112.

The system 100 then determines if the difference information 234 is displayable in the popup window 236. If it is determined that the difference information 234 is displayable in the popup window 236, the popup window 236 is generated and displayed over the subsequent TARGET email No. 31. If it is determined that the difference information 234 is not displayable in the popup window 236, then system 100 provides several different alternative destinations for the difference information 234, as discussed previously.

Figure 8:
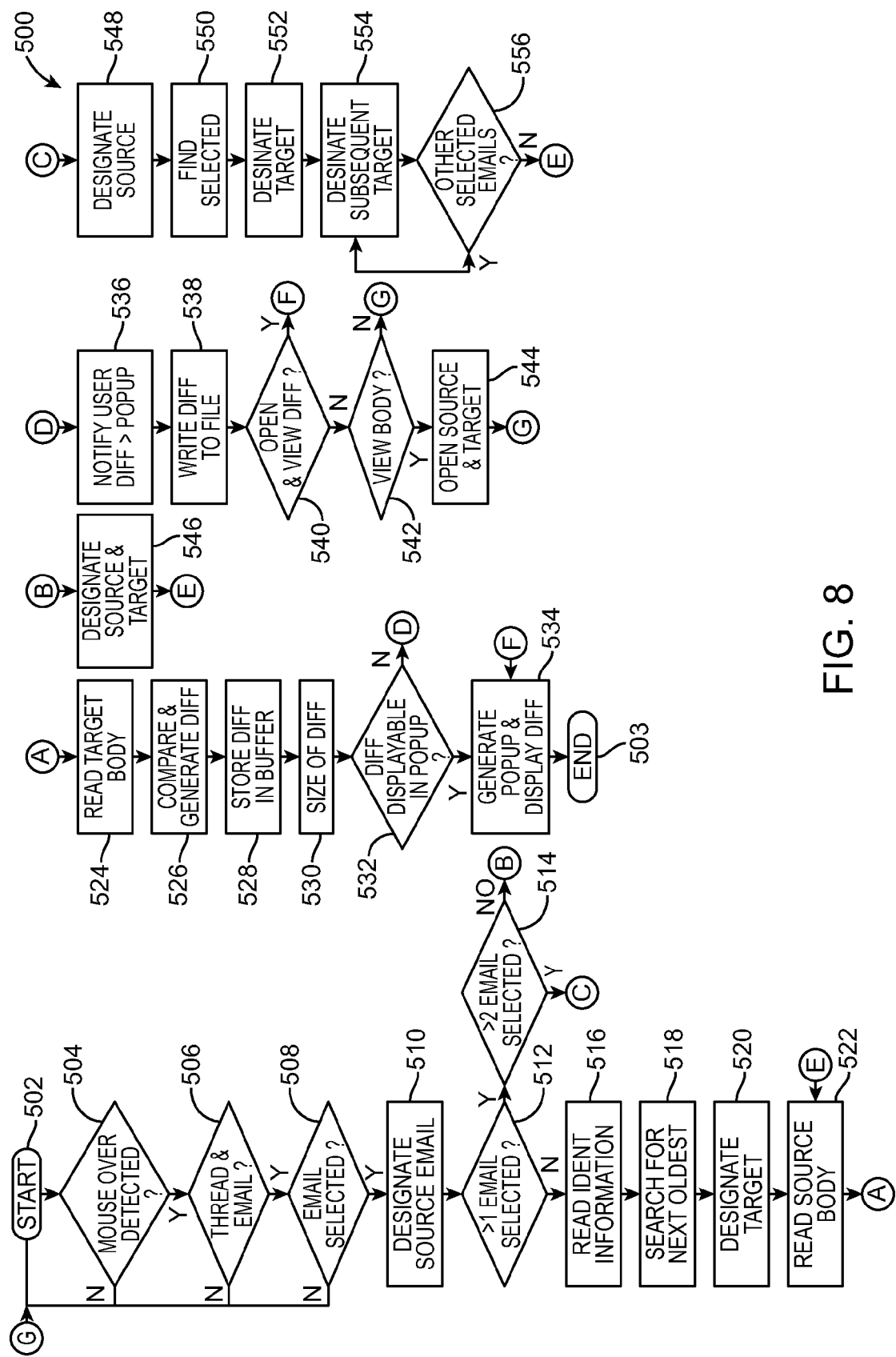
FIG. 8 is a flowchart showing an exemplary method for displaying differences in content between email messages in an email thread in accordance with an embodiment of the invention.

Referring to drawing Figures, and particularly to FIG. 8, a flowchart of an exemplary method, shown generally at 500, for displaying differences in content between email messages 206 in an email thread 204 in accordance with an embodiment of the invention. The method 500 starts in start block 502, where the method 500 is invoked. In decision block 504 it is determined if a mouseover is detected. If it is determined that a mouseover is not detected in decision block 504, the method 500 returns to start block 502. If a mouseover is detected, then the method 500 continues to decision block 506, where it is determined if the pointer 132 is positioned over an email 206 in an email thread 204. If it is determined that the pointer 132 is not positioned over an email 206 in an email thread 204 in decision block 506, then the method 500 returns to start block 502.

If it is determined the pointer 132 is positioned over an email 206 in an email thread 204, the method 500 continues to decision block 508 where it is determined if the email 206 positioned beneath the pointer 132 is selected. If it is determined that the email 206 is not selected, the method 500 returns to start block 502. If the email 206 is selected in decision block 508, the method 500 continues to process block 510, where the system 100 designates the selected email 206 as the SOURCE email. The method 500 then determines if more than one email 206 is selected, in decision block 512. If more than one email 206 is selected, then method 500 continues to decision block 514, and if only one email 206 is selected, the method 500 continues to process block 516.

In process block 516, identifying information, provided in each email 206 in the thread is read. The identifying information may include information contained in the message header 208 of the SOURCE email and other emails 206 in the thread 204, such as metadata (not shown), the time stamp 214, and other information associated with the emails 206 in the thread 204. The system 100 then searches for the next oldest email 206 in the thread 204, in process block 218. The next oldest email 206 is determined by identifying information provided in each email 206 in the thread. In some embodiments, the identifying information includes the time stamp 214, metadata contained in the SOURCE email (not shown), and other information associated with each email 206. Once the next oldest email 206 in the thread 204 is found, that email is designated as the TARGET email, shown in process block 520.

The method 500 continues to process block 522, where the system 100 reads data from the message body 224 of the SOURCE email into the buffer 182, and then reads the message body 224 of the TARGET email into the buffer 182, in process block 524. In process block 526, a difference comparison between the content of the body of the SOURCE email and TARGET email is performed to generate difference information 234. Any difference between the data contained in the body of the SOURCE email and TARGET email comprises difference information 234. The difference information 234 is then stored in a DIFF buffer 184, in process block 528.

In process block 530, the amount of data that the difference information 234 comprises is determined. In one exemplary embodiment, the system 100 may determine the number lines of text 226 that the difference information 234 comprises. Once the amount of data the difference information 234 comprises is determined, the method 500 then determines if the difference information 234 is greater than a maximum amount of data displayable in the popup window 236, in decision block 532. If it is determined that the difference information 234 is equal to or less than the maximum amount of data displayable in the popup window 236, then the popup window 236 is generated and the difference information 234 displayed in the popup window 236, in process block 534. In preferred embodiments, the popup window 236 is displayed over the TARGET email to quickly indicate to the user what the difference information 234 is between the SOURCE email and TARGET email. The method 500 then ends at end block 503.

Returning to decision block 532, if it is determined that the difference information 234 is greater than the maximum displayable amount of data in the popup window 236, the method 500 may proceed with different alternatives. In one embodiment, in process block 536, the user is notified that the difference information 234 is greater than the maximum amount of data displayable in the popup window 236. In some embodiments, if it is determined that the difference information 234 is greater than the maximum displayable amount of data in the popup window 236, in decision block 532, the difference information 234 is automatically written to a difference file 222 on the data storage device 114, in process block 538. The difference information 234 may then be read from the difference file 222 at a later time by the user.

In decision block 540, the user is queried to determine if they want the difference information 234 to be displayed in the popup window 236, even though the difference information 234 exceeds the determined maximum amount of data displayable in the popup window 236. If the user does want the difference information 234 displayed in the popup window 236, then the method 500 returns to process block 534. In this optional embodiment, the dimensions of the popup window 236 may be increased temporarily to contain the difference information 234.

Returning to decision block 540, if the user does not want the difference information 234 displayed in the popup window 236, the method 500 proceeds to decision block 542, the user is queried to determine if they elect to open the SOURCE email and TARGET email to view the message body 224 of each email 206 to ascertain the differences between the SOURCE and TARGET emails 206. If the user elects to open the SOURCE and TARGET emails to view the message body 224 of each email 206 to ascertain the differences between the emails 206, the user opens and views the message body 224 of each email 206, in process block 544. The method 500 then returns to start block 502. Alternatively, the user may elect to not open the SOURCE and TARGET emails 206. As such, the method 500 returns to start block 502.

Returning to decision block 512, if it is determined more than one email 206 is selected, the method 500 continues to decision block 514, where it is determined if more than two emails 206 are selected. If only two emails 206 are selected, the method 500 continues to process block 546. In process block 546 the email 206 beneath the detected mouseover is designated as the SOURCE email and the second selected email is designated as the TARGET email. The method 500 then returns to process block 522 and proceeds as previously discussed.

Returning to decision block 514, if it is determined more than two emails 206 are selected, the method 500 continues to process block 548. In process block 548 the email 206 beneath the detected mouseover is designated as the SOURCE email. In process block 550, the method 500 determines how many emails 206 are selected. In process block 552, the method 500 designates one of any of the remaining selected emails 206 the TARGET email. Next, in process block 554, and a next selected email is designated as a subsequent TARGET email. In decision block 556, it is determined if any other emails 206 are selected.

If additional emails 206 are selected, then the method 500 returns to process block 554 where one of any of the remaining selected emails 206 are designated as a subsequent TARGET email. In the embodiments, the method 500 may determine the TARGET email and subsequent TARGET emails arbitrarily. In optional embodiments, the method 500 may determine the TARGET email and subsequent TARGET email by identifying information provided in each email 206, such as the time stamp 214 associated with each email 206, as discussed previously. If it is determined in decision block 556 that no additional emails 206 are selected, the method 500 returns to process block 522 The method 500 then returns to process block 522 and proceeds as previously discussed.

Those skilled in the art will appreciate that various adaptations and modifications can be configured without departing from the scope and spirit of the embodiments described herein. Therefore, it is to be understood that, within the scope of the appended claims, the embodiments of the invention may be practiced other than as specifically described herein.

What is claimed is:

1. A system comprising:
   a pointer displayable on a display;
   a processor coupled to the pointer, the processor:
   selecting a first email message by detecting a mouseover of an email listing linked to the first email message, the email listing on the display, the email listing comprising one of a plurality of email listings on the display, each email listing linked to an email message, at least a portion of the email listings comprising links to email messages of an email thread;
   designating the first selected email message in the email thread as a source email message;
   determining if more than one email listings is selected in response to detecting the mouseover of the email listing;
   in response to determining that more than one email message is not selected, searching the thread for a target email message:
      searching the thread, the search comprising reading identifying data in each email message of the thread and comparing the identifying data of each email message for determining a next oldest email message in the thread, the next oldest email message comprising the target email message; and
      comparing content of the source email message to content of the target email message for generating content difference; and
      generating a popup window and displaying the content difference in the popup window; and
   in response to determining that more than one email listing is selected:
      designating a second email message linked to a second selected email listing as a first target email message;
      designating any subsequent email messages linked to selected email listings as subsequent target email messages;
      comparing content of the first target email message to the content of the source email message for generating content difference;
      generating a popup window and displaying the content difference in the popup window;
      comparing content of each subsequent target email message to the content of the source email message for generating additional content difference; and
      generating a popup window and displaying the additional content difference in the popup window.

2. The system of claim 1, wherein each popup window corresponding to a each target email message for displaying the content difference between each target email message and the source email message is positioned in the display over the corresponding target email listing.

3. The system of claim 2, further comprising, when a plurality of popup windows displaying a difference between the source email and a target email are displayed, displaying the popup windows simultaneously.

4. The system of claim 1, further comprising:
determining if the difference content to be displayed in the popup window exceeds a maximum; and
if the difference content exceeds the maximum then, performing one of: terminating the popup window, writing the difference content to a file, and displaying the difference content.

5. The system of claim 4, further comprising:
indicating to a user that the difference content to be displayed in the popup window exceeds the maximum; and
receiving instructions from the user to perform one of: terminating the popup window, writing the difference content to a file, and displaying the difference content.

6. The system of claim 1, wherein the processor compares content of the source email and the one or more target emails and generates one or more popup windows independent of opening of the source and target emails.

7. A computer program product comprising a computer usable medium having computer usable program code embodied therewith, the computer usable program code comprising non-transitory computer usable program code configured to:
select a first email message by detecting a mouseover of an email listing linked to the first email message, the email listing on the display, the email listing comprising one of a plurality of email listings on the display, each email listing linked to an email message, at least a portion of the email listings comprising links to email messages of an email thread;
designate the first selected email message in the email message thread as a source email message;
determine if more than one email listing in the thread is selected, in response to detecting the mouseover of the email listing;
if it is determined that more than one email listing is not selected then:
search the thread for a target email message, searching the email message thread comprising reading identifying data in each email message in the thread, and comparing the identifying data of each email message for determining a next oldest email message in the thread, the next oldest email message comprising the target email message;
compare content of the target email message with content of the source email message for generating content difference; and
generate a popup window and display the content difference in the popup window; and
if it is determined that more than one listing message is selected:
designate a second email message linked to a selected email listing as a first target email message;
designate subsequent email messages linked to additional selected email links as subsequent target email messages;
compare content of the first target email message to the content of the source email message for generating content difference;
generate a popup window and display the content difference;
compare content of each subsequent target email message to the content of the source email message for generating additional content difference; and
generate a popup window and display the additional content difference in the popup window.

8. The computer program product of claim 7, wherein each popup window is displayed over each corresponding target email listing.

9. The computer program product of claim 8, wherein each popup window is simultaneously displayed.

10. The computer program product of claim 7, further comprising computer usable program code configured to:
determine if the content difference to be displayed in the popup window exceeds a maximum, if the content difference exceeds the maximum then;
perform one of: terminating the popup window, writing the content difference to a file, and displaying the content difference.

11. The computer program product of claim 10, further comprising computer usable program code configured to:
determine if the content difference to be displayed in a popup window exceeds a maximum, if the content difference exceeds the maximum then;
indicate to a user that the content difference to be displayed in the popup window exceeds the maximum; and
receive instructions from the user for performing one of: terminating the popup window, writing the content difference to a file, and displaying the content difference.

12. The computer program product of claim 7, wherein the program code compares content of the source email and the one or more target emails and generates one or more popup windows independent of opening of the source and target emails.

* * * * *